United States Patent
Jin et al.

(10) Patent No.: US 12,167,371 B2
(45) Date of Patent: Dec. 10, 2024

(54) METHOD AND APPARATUS FOR SENDING AND RECEIVING HARQ-ACK MESSAGE

(71) Applicant: Huawei Technologies Co., Ltd., Shenzhen (CN)

(72) Inventors: Juening Jin, Shanghai (CN); Shurong Jiao, Shanghai (CN); Meng Hua, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 421 days.

(21) Appl. No.: 17/522,621

(22) Filed: Nov. 9, 2021

(65) Prior Publication Data

US 2022/0070828 A1 Mar. 3, 2022

Related U.S. Application Data

(63) Continuation of application No. PCT/CN2020/087920, filed on Apr. 29, 2020.

(30) Foreign Application Priority Data

May 10, 2019 (CN) .......................... 201910390506.0

(51) Int. Cl.
 *H04W 72/02* (2009.01)
 *H04L 1/1812* (2023.01)
 (Continued)

(52) U.S. Cl.
 CPC ........... *H04W 72/02* (2013.01); *H04L 1/1812* (2013.01); *H04L 5/0053* (2013.01); *H04W 72/0446* (2013.01); *H04W 72/21* (2023.01)

(58) Field of Classification Search
 CPC . H04W 72/02; H04W 72/21; H04W 72/0446; H04L 1/1812; H04L 5/0053
 (Continued)

(56) References Cited

U.S. PATENT DOCUMENTS

2019/0037561 A1\* 1/2019 Jung .................... H04L 1/1812
2019/0082431 A1 3/2019 Yi et al.
(Continued)

FOREIGN PATENT DOCUMENTS

CN 106788926 A 5/2017
CN 109600847 A 4/2019
(Continued)

OTHER PUBLICATIONS

CAICT, "UCI enhancements for URLLC," 3GPP TSG RAN WG1 Meeting #97, Reno, USA, R1-1907203, total 7 pages, 3rd Generation Partnership Project, Valbonne, France (May 13-17, 2019).
"3rd Generation Partnership Project;Technical Specification Group Radio Access Network;NR;Radio Resource Control (RRC) protocol specification (Release 15)," 3GPP TS 38.331 V15.5.1, total 491 pages, 3rd Generation Partnership Project, Valbonne, France (Apr. 2019).
(Continued)

*Primary Examiner* — Chi Tang P Cheng
(74) *Attorney, Agent, or Firm* — Leydig, Voit & Mayer, Ltd.

(57) ABSTRACT

A method for sending and receiving a HARQ-ACK message is provided. The method includes: A terminal device selects a first PUCCH resource from at least one first PUCCH resource set based on a first time subunit. The first time subunit is a time subunit in which the HARQ-ACK message is located. The first PUCCH resource is a PUCCH resource in the first time subunit. The at least one first PUCCH resource set is configured by a network device for the terminal device based on a time unit. The terminal device sends the HARQ-ACK message to the network device based on the first PUCCH resource.

14 Claims, 6 Drawing Sheets

(51) Int. Cl.
*H04L 5/00* (2006.01)
*H04W 72/0446* (2023.01)
*H04W 72/21* (2023.01)

(58) Field of Classification Search
USPC ......................................................... 370/329
See application file for complete search history.

(56) References Cited

U.S. PATENT DOCUMENTS

2020/0128542 A1* 4/2020 Tang ..................... H04W 72/23
2022/0038242 A1* 2/2022 Yoshioka .............. H04W 72/23

FOREIGN PATENT DOCUMENTS

| CN | 109644466 A | 4/2019 |
| CN | 110535608 A | 12/2019 |
| WO | 2021097694 A1 | 5/2021 |

OTHER PUBLICATIONS

"3rd Generation Partnership Project; Technical Specification Group Radio Access Network; NR; Multiplexing and channel coding (Release 15)," 3GPP TS 38.212 V15.5.0, total 101 pages, 3rd Generation Partnership Project, Valbonne, France (Mar. 2019).

"3rd Generation Partnership Project;Technical Specification Group Radio Access Network;NR;Physical layer procedures for control (Release 15)," 3GPP TS 38.213 V15.5.0, total 104 pages, 3rd Generation Partnership Project, Valbonne, France (Mar. 2019).

"Maintenance issues of physical uplink control channel," 3GPP TSG-RAN WG1 Meeting#94bis, Chengdu, China, R1-1811489, XP051518892, Total 10 pages, 3rd Generation Partnership Project, Valbonne, France (Oct. 8-12, 2018).

"PUCCH structure in short-duration," 3GPP TSG RAN WG1 Meeting #93, Busan, Korea, R1-1807061, XP051442259, Total 5 pages, 3rd Generation Partnership Project, Valbonne, France (May 21-25, 2018).

* cited by examiner

METHOD AND APPARATUS FOR SENDING AND RECEIVING HARQ-ACK MESSAGE

CROSS-REFERENCE TO RELATED APPLICATIONS

This application is a continuation of International Application No. PCT/CN2020/087920, filed on Apr. 29, 2020, which claims priority to Chinese Patent Application No. 201910390506.0, filed on May 10, 2019. The aforementioned applications are hereby incorporated by reference in their entireties.

TECHNICAL FIELD

This application relates to the field of communications technologies, and in particular, to a method and an apparatus for sending and receiving a HARQ-ACK message.

BACKGROUND

Mobile communications technologies have profoundly changed people's lives, and people's pursuit for a mobile communications technology having higher performance has never ceased. To cope with explosive growth of mobile data traffic in the future, massive mobile communications device connections, and various emerging new services and application scenarios, a fifth generation (5G) mobile communications system emerges. The International Telecommunication Union (ITU) defines three types of application scenarios for 5G and a future mobile communications system: enhanced mobile broadband (eMBB), ultra-reliable and low-latency communication (URLLC), and massive machine-type communications (mMTC).

A URLLC service has very strict requirements for latency. Latency of the URLLC service is required to be within 0.5 millisecond (ms) when reliability is not considered. Transmission latency is required to be within 1 ms to satisfy 99.999% reliability. In a long term evolution (LTE) system, a minimum time scheduling unit is a transmission time interval (TTI) including symbols within 1 ms. To meet the latency requirement of the URLLC service, a shorter time scheduling unit may be used for data transmission on a radio air interface. For example, a minimum time scheduling unit is a subslot or a slot with a larger subcarrier spacing. One slot may include a plurality of subslots, and one subslot includes one or more time domain symbols. The time domain symbols herein may be orthogonal frequency division multiplexing (OFDM) symbols.

Therefore, it is proposed in a conventional technology that a plurality of hybrid automatic repeat request acknowledgement (HARQ-ACK) messages are fed back in one slot. To be specific, one slot is divided into a plurality of subslots, and a HARQ-ACK message is fed back in each subslot. This helps reduce feedback latency of the URLLC service. To achieve this, an existing solution proposes that a subslot-level physical uplink control channel (PUCCH) resource set is configured for a terminal device by using higher-layer signaling. However, if one slot is divided into X subslots, and X is configurable, the PUCCH resource set needs to be reconfigured as X changes. In addition, a PUCCH resource in the PUCCH resource set may fall outside a subslot or cross a slot boundary. Therefore, configuring the PUCCH resource set according to the foregoing solution is complex.

SUMMARY

Embodiments of this application provide a method and an apparatus for sending and receiving a HARQ-ACK message, to resolve high complexity in configuring a subslot-level PUCCH resource set for a terminal device by using higher-layer signaling.

According to a first aspect, an embodiment of this application provides a method for sending a HARQ-ACK message. The method may be performed by a terminal device or a chip in the terminal device. The method includes: The terminal device selects a first PUCCH resource from at least one first PUCCH resource set based on a first time subunit, and sends a HARQ-ACK message to a network device based on the first PUCCH resource. The first time subunit is a time subunit in which the HARQ-ACK message is located. The first PUCCH resource is a PUCCH resource in the first time subunit. The at least one first PUCCH resource set is configured by the network device for the terminal device based on a time unit.

According to the foregoing method, the network device configures a time unit-level PUCCH resource set by using higher-layer signaling, and the terminal device determines a PUCCH resource corresponding to a time subunit from the time unit-level PUCCH resource set based on the time subunit. This can avoid exceptions, for example, a large amount of higher-layer signaling needs to be reconfigured, a PUCCH resource falls outside a time subunit, or a PUCCH resource crosses a time unit boundary.

In an embodiment, the first PUCCH resource is one PUCCH resource in a second PUCCH resource set; and the second PUCCH resource set is an overlapping part between a set of PUCCH resources whose starting symbols are located in the first time subunit in the at least one first PUCCH resource set and one PUCCH resource set determined from the at least one first PUCCH resource set based on a quantity of bits of the HARQ-ACK message.

According to the foregoing embodiment, the terminal device determines a time subunit-level PUCCH resource set based on the time subunit.

In an embodiment, the at least one first PUCCH resource set corresponds to a first priority, and a priority of a service corresponding to the HARQ-ACK message is the first priority.

According to the foregoing embodiment, the network device may configure a group of first PUCCH resource sets for each of different priorities of services based on the time unit.

In an embodiment, a quantity of symbols of a PUCCH resource included in each first PUCCH resource set is less than, or less than or equal to a maximum quantity of symbols of a PUCCH resource specified in a protocol or configured by the network device; and/or a maximum code rate of a PUCCH resource included in each first PUCCH resource set is less than, or less than or equal to a maximum code rate of a PUCCH resource specified in a protocol or configured by the network device.

According to the foregoing embodiment, the PUCCH resource included in the first PUCCH resource set can meet requirements of a service on latency and/or reliability.

In an embodiment, a maximum code rate of each PUCCH resource included in the second PUCCH resource set is less than, or less than or equal to a maximum code rate of a PUCCH resource specified in a protocol or configured by the network device; and/or a quantity of symbols of a PUCCH resource included in the second PUCCH resource set is less than, or less than or equal to a maximum quantity of symbols of a PUCCH resource specified in a protocol or configured by the network device.

According to the foregoing embodiment, the PUCCH resource included in the second PUCCH resource set can meet requirements of a service on latency and/or reliability.

In an embodiment, the terminal device receives downlink control information from the network device. The downlink control information includes time subunit quantity indication information K1 of an interval between a time subunit in which a PDSCH is located and the first time subunit, and a PRI. K1 is used to determine the first time subunit. The PRI is used to determine the first PUCCH resource.

According to the foregoing embodiment, the terminal device may determine the first time subunit based on K1, and determine the first PUCCH resource from the second PUCCH resource set based on the PRI.

In an embodiment, if a quantity M of PUCCH resources included in the second PUCCH resource set is greater than $2^k$, and k is a quantity of bits occupied by the PRI, the first PUCCH resource is one PUCCH resource in $2^k$ PUCCH resources in the second PUCCH resource set. k is a positive integer greater than or equal to 1. An end symbol of any one of the $2^k$ PUCCH resources is less than an end symbol of any one of remaining M–$2^k$ PUCCH resources in the second PUCCH resource set.

According to the foregoing embodiment, the terminal device may determine the first PUCCH resource from the second PUCCH resource set based on the PRI.

In an embodiment, if K1=0, the first time subunit is a time subunit in which a symbol is located, and the symbol corresponds to a symbol sequence number obtained by adding a symbol sequence number of an end symbol of the PDSCH to a quantity of symbols corresponding to PDSCH processing time.

According to the foregoing embodiment, this can avoid a waste of K1, and increase an indication range of K1 without increasing overheads of K1.

In an embodiment, if K1=x, the first time subunit is an $(x+1)^{th}$ time subunit that has a PUCCH resource belonging to the second PUCCH resource set after the time subunit in which the PDSCH is located: or the first time subunit is an $(x+1)^{th}$ time subunit that includes at least one uplink symbol after the time subunit in which the PDSCH is located.

According to the foregoing embodiment, this can avoid a waste of K1, and increase an indication range of K1 without increasing overheads of K1.

According to a second aspect, an embodiment of this application provides a method for receiving a HARQ-ACK message. The method may be performed by a network device or a chip in the network device. The method includes: The network device sends configuration information to a terminal device, where the configuration information indicates at least one first PUCCH resource set, and the at least one first PUCCH resource set is configured by the network device for the terminal device based on a time unit. The network device receives a HARQ-ACK message from the terminal device based on a first PUCCH resource, where a first time subunit is a time subunit in which the HARQ-ACK message is located, the first PUCCH resource is a PUCCH resource in the first time subunit, and the first PUCCH resource is one PUCCH resource in the at least one first PUCCH resource set.

According to the foregoing method, the network device configures a time unit-level PUCCH resource set by using higher-layer signaling, and the terminal device determines a PUCCH resource corresponding to a time subunit from the time unit-level PUCCH resource set based on the time subunit. This can avoid exceptions, for example, a large amount of higher-layer signaling needs to be reconfigured, a PUCCH resource falls outside a time subunit, or a PUCCH resource crosses a time unit boundary.

In an embodiment, the first PUCCH resource is one PUCCH resource in a second PUCCH resource set; and the second PUCCH resource set is an overlapping part between a set of PUCCH resources whose starting symbols are located in the first time subunit in the at least one first PUCCH resource set and one PUCCH resource set determined from the at least one first PUCCH resource set based on a quantity of bits of the HARQ-ACK message.

According to the foregoing embodiment, the terminal device determines a time subunit-level PUCCH resource set based on the time subunit.

In an embodiment, the at least one first PUCCH resource set corresponds to a first priority, and a priority of a service corresponding to the HARQ-ACK message is the first priority.

According to the foregoing embodiment, the network device may configure a group of first PUCCH resource sets for each of different priorities of services based on the time unit.

In an embodiment, a quantity of symbols of a PUCCH resource included in each first PUCCH resource set is less than, or less than or equal to a maximum quantity of symbols of a PUCCH resource specified in a protocol or configured by the network device; and/or a maximum code rate of a PUCCH resource included in each first PUCCH resource set is less than, or less than or equal to a maximum code rate of a PUCCH resource specified in a protocol or configured by the network device.

According to the foregoing embodiment, the PUCCH resource included in the first PUCCH resource set can meet requirements of a service on latency and/or reliability.

In an embodiment, a maximum code rate of each PUCCH resource included in the second PUCCH resource set is less than, or less than or equal to a maximum code rate of a PUCCH resource specified in a protocol or configured by the network device; and/or a quantity of symbols of a PUCCH resource included in the second PUCCH resource set is less than, or less than or equal to a maximum quantity of symbols of a PUCCH resource specified in a protocol or configured by the network device.

According to the foregoing embodiment, the PUCCH resource included in the second PUCCH resource set can meet requirements of a service on latency and/or reliability.

In an embodiment, the network device sends downlink control information to the terminal device. The downlink control information includes time subunit quantity indication information K1 of an interval between a time subunit in which a physical downlink shared channel (PDSCH) is located and the first time subunit, and a physical uplink control channel resource indicator (PRI). K1 is used to determine the first time subunit. The PRI is used to determine the first PUCCH resource.

According to the foregoing embodiment, the terminal device may determine the first time subunit based on K1, and determine the first PUCCH resource from the second PUCCH resource set based on the PRI.

In an embodiment, if a quantity M of PUCCH resources included in the second PUCCH resource set is greater than $2^k$, and k is a quantity of bits occupied by the PRI, the first PUCCH resource is one PUCCH resource in $2^k$ PUCCH resources in the second PUCCH resource set. k is a positive integer greater than or equal to 1. An end symbol of any one of the $2^k$ PUCCH resources is less than an end symbol of any one of remaining M–$2^k$ PUCCH resources in the second PUCCH resource set.

According to the foregoing embodiment, the terminal device may determine the first PUCCH resource from the second PUCCH resource set based on the PRI.

In an embodiment, if K1=0, the first time subunit is a time subunit in which a symbol is located, and the symbol corresponds to a symbol sequence number obtained by adding a symbol sequence number of an end symbol of the PDSCH to a quantity of symbols corresponding to PDSCH processing time.

According to the foregoing embodiment, this can avoid a waste of K1, and increase an indication range of K1 without increasing overheads of K1.

In an embodiment, if K1=x, the first time subunit is an $(x+1)^{th}$ time subunit that has a PUCCH resource belonging to the second PUCCH resource set after the time subunit in which the PDSCH is located: or the first time subunit is an $(x+1)^{th}$ time subunit that includes at least one uplink symbol after the time subunit in which the PDSCH is located.

According to the foregoing embodiment, this can avoid a waste of K1, and increase an indication range of K1 without increasing overheads of K1.

According to a third aspect, an embodiment of this application provides an apparatus for sending a HARQ-ACK message. The apparatus may be a terminal device, or may be a chip in the terminal device. The apparatus may include a processing unit, a sending unit, and a receiving unit. When the apparatus is the terminal device, the processing unit may be a processor, and the sending unit and the receiving unit may be a transceiver. The terminal device may further include a storage unit, and the storage unit may be a memory. The storage unit is configured to store instructions. The processing unit executes the instructions stored in the storage unit, so that the terminal device is enabled to perform the method according to the first aspect or any one of the embodiments of the first aspect. When the apparatus is the chip in the terminal device, the processing unit may be the processor, and the sending unit and the receiving unit may be input/output interfaces, pins, circuits, or the like. The processing unit executes instructions stored in a storage unit, so that the chip is enabled to perform the method according to the first aspect or any one of the embodiments of the first aspect. The storage unit is configured to store the instructions. The storage unit may be a storage unit (for example, a register or a cache) in the chip, or may be a storage unit (for example, a read-only memory or a random access memory) outside the chip in the terminal device.

According to a sixth aspect, an embodiment of this application provides an apparatus for receiving a HARQ-ACK message. The apparatus may be a network device, or may be a chip in the network device. The apparatus may include a processing unit, a sending unit, and a receiving unit. When the apparatus is the network device, the processing unit may be a processor, and the sending unit and the receiving unit may be a transceiver. The network device may further include a storage unit, and the storage unit may be a memory. The storage unit is configured to store instructions. The processing unit executes the instructions stored in the storage unit, so that the network device is enabled to perform the method according to the second aspect or any one of the embodiments of the second aspect. When the apparatus is the chip in the network device, the processing unit may be a processor, and the sending unit and the receiving unit may be input/output interfaces, pins, circuits, or the like. The processing unit executes instructions stored in a storage unit, so that the chip is enabled to perform the method according to the second aspect or any one of the embodiments of the second aspect. The storage unit is configured to store the instructions. The storage unit may be a storage unit (for example, a register or a cache) in the chip, or may be a storage unit (for example, a read-only memory or a random access memory) outside the chip in the network device.

According to a fourth aspect, an embodiment of this application further provides a non-transitory computer-readable storage medium, and the computer-readable storage medium stores a computer program. When the computer program runs on a computer, the computer is enabled to perform the method according to the first aspect and the second aspect.

According to a fifth aspect, an embodiment of this application further provides a computer program product including a program. When the program runs on a computer, the computer is enabled to perform the method according to the first aspect and the second aspect.

BRIEF DESCRIPTION OF DRAWINGS

FIG. 2 (b) is a schematic diagram of a PUCCH resource according to an embodiment of this application, where the PUCCH resource configured for a terminal device by using higher-layer signaling crosses a slot boundary:

DESCRIPTION OF EMBODIMENTS

The following describes embodiments of this application with reference to the accompanying drawings.

This application is mainly applied to a fifth-generation wireless communications (NR) system, and may also be applied to another communications system, for example, a narrowband internet of things (NB-IoT) system, a machine type communication (MTC) system, or a future next-generation communications system.

Figure 1:
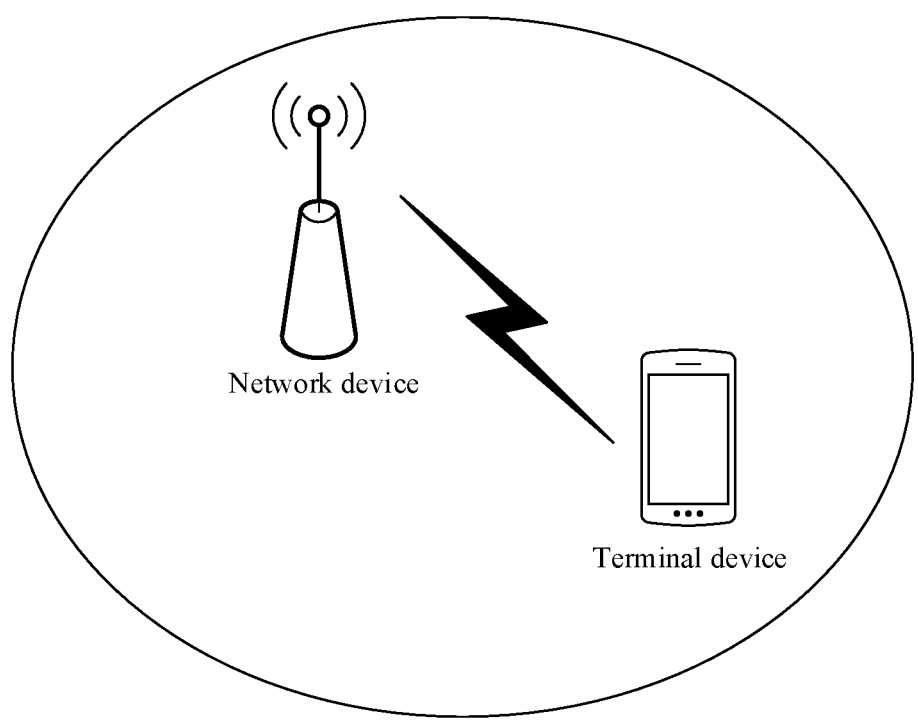
FIG. 1 is a schematic diagram of an architecture of a communications system according to an embodiment of this application.

Network elements in this embodiment of this application include a terminal device and a network device. As shown in FIG. 1, a network device and a terminal device form a communications system. In the communications system, the network device sends information to the terminal device through a downlink channel, and the terminal device sends information to the network device through an uplink channel. The terminal device may be a mobile phone, a tablet computer, a computer with wireless sending and receiving functions, an Internet of Things terminal device, or the like.

The terminal device may also be referred to as a mobile station, a remote station, a remote terminal, an access terminal, or a user agent. The terminal device may also be an automobile in vehicle-to-vehicle (V2V) communication, a machine in machine type communication, or the like. This is not limited herein. The network device may be a base station in various forms, for example, a macro base station, a micro base station (which may also be referred to as a small cell), a relay station, an access point, an evolved NodeB (eNodeB), a wireless fidelity access point (Wi-Fi AP), worldwide interoperability for microwave access base station (WiMAX BS), or the like. This is not limited herein. In addition, a network device capable of providing a radio access function may have a different name in systems with different radio access technologies. For example, a network device is referred to as an evolved NodeB (eNB or eNodeB) in an LTE system, a Node B in a third generation (3G) system, or a gNB (gNodeB) in a new generation system.

The foregoing network elements may be network elements implemented on dedicated hardware, software instances running on the dedicated hardware, or instances of virtualization functions on an appropriate platform. In addition, this embodiment of this application may also be applicable to another future-oriented communications technology. Network architectures and service scenarios described in this application are intended to describe technical solutions in this application more clearly, but are not intended to limit technical solutions provided in this application. A person of ordinary skill in the art may know that as network architectures evolve and a new service scenario emerges, technical solutions provided in this application are also applicable to a similar technical problem.

In this embodiment of this application, one time unit includes a plurality of time domain symbols. For example, the time unit may be a subframe in an LTE system or a slot in an NR system. In the LTE system, single-carrier frequency-division multiple access (SC-FDMA) is used for uplink. The single-carrier frequency-division multiple access is also referred to as discrete Fourier transform-spread-orthogonal frequency division multiplexing (DFT-spread-OFDM). Therefore, uplink time domain symbols refer to SC-FDMA symbols in the LTE system. In the NR system, OFDM or DFT-spread-OFDM is used for uplink. Therefore, uplink time domain symbols refer to OFDM symbols or DFT-spread-OFDM symbols in the NR system. One time unit may be divided into a plurality of time subunits. A quantity of time domain symbols included in each time subunit is less than a total quantity of time domain symbols included in a time unit to which the time subunit belongs. The quantity of time domain symbols included in each time subunit may be different, and may be configured by the network device or specified in a protocol. For example, in the NR system, one slot may include a plurality of subslots, and one subslot includes one or more time domain symbols. The time domain symbols herein may be OFDM symbols. A quantity of OFDM symbols included in each subslot is greater than or equal to 1, and less than or equal to 7.

HARQ is a technology that combines forward error correction code and automatic repeat request. The forward error correction code adds redundancy information to enable a receive end to correct some errors. This helps reduce a quantity of times of retransmissions. A HARQ-ACK message may include a positive acknowledgement (ACK) or a negative acknowledgement (NACK). If the receive end (for example, a terminal device) detects that a received physical downlink shared channel (PDSCH) is correct, the receive end sends a HARQ-ACK message to a transmit end (for example, a network device), and the HARQ-ACK message includes a positive acknowledgement (ACK). If the receive end detects that the received PDSCH is incorrect, the receive end sends a HARQ-ACK message to the transmit end, where the HARQ-ACK message includes a negative acknowledgement (NACK). After receiving the NACK, the transmit end resends the PDSCH.

In the conventional technology, the terminal device needs the following information to determine a PUCCH resource used to send the HARQ-ACK message.

1. K1: K1 indicates slot quantity indication information of an interval between a slot in which a physical downlink shared channel is located and a slot in which the HARQ-ACK message is located (delay between DL PDSCH reception and corresponding HARQ-ACK transmission on UL). K1 occupies 3 bits, and may be used to determine the slot in which the HARQ-ACK message is located.

2. PUCCH resource set: A group of PUCCH resource sets is preconfigured by a higher layer, and includes four PUCCH resource sets. A PUCCH resource set 0 includes 8 to 32 PUCCH resources. PUCCH resource sets 1 to 3 each include not more than 8 PUCCH resources. The terminal device selects one PUCCH resource set from the four PUCCH resource sets based on a quantity of bits of the HARQ-ACK message.

3. PUCCH resource indicator (PUCCH resource indicator, PRI): The PRI occupies 3 bits. After selecting the PUCCH resource set, the terminal device needs to determine one PUCCH resource from the selected PUCCH resource set. A parameter of each PUCCH resource includes a starting symbol (starting symbol (within the slot)) index of the PUCCH resource in a slot, a quantity of symbols of the PUCCH resource, a frequency domain position, an orthogonal cover code (OCC) index, and the like. Indication of the PRI is different for different PUCCH resource sets. When the selected PUCCH resource set is any one of the PUCCH resource sets 1 to 3, one PUCCH resource may be directly indicated by the PRI because the three PUCCH resource sets each include not more than 8 PUCCH resources. When the selected PUCCH resource set is the PUCCH resource set 0, one PUCCH resource needs to be indicated both by the PRI and an index of a starting control channel element (CCE) in which downlink control information (DCI) is located.

Figure 2A:
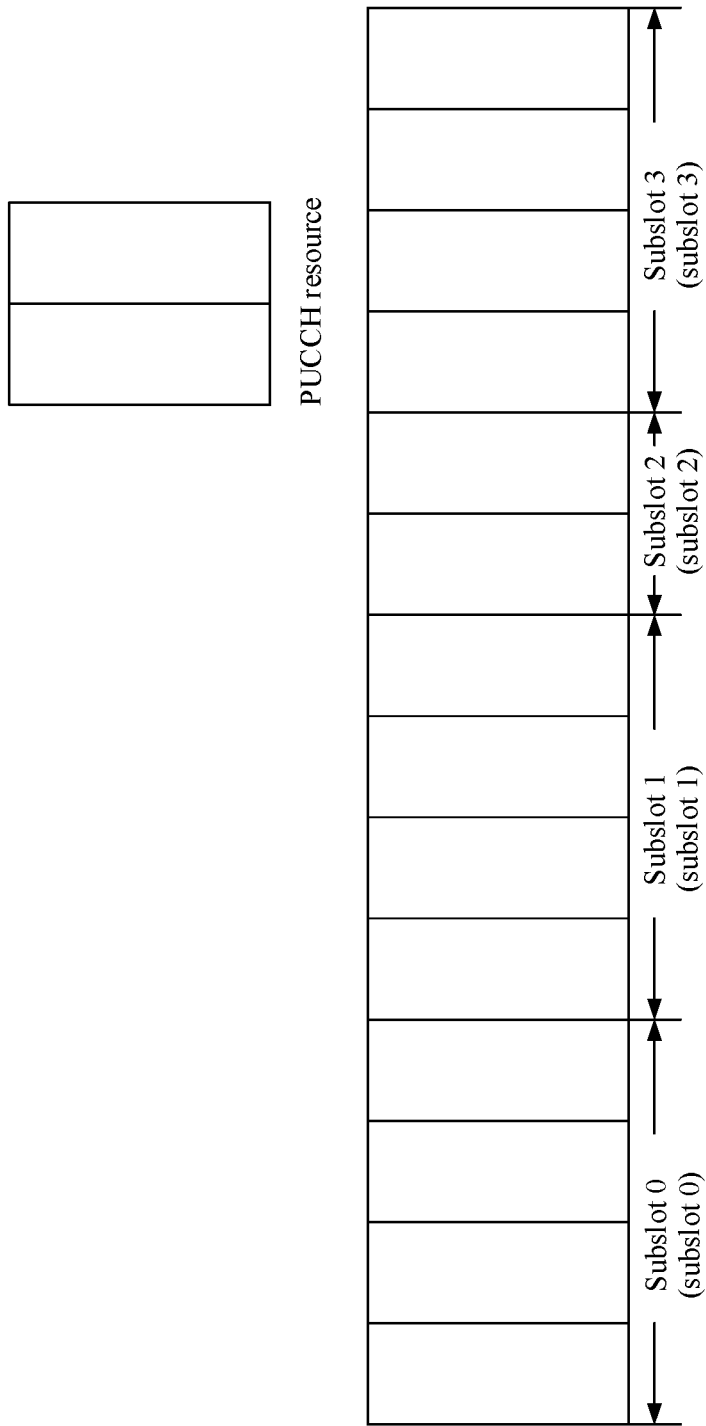
FIG. 2 (a) is a schematic diagram of a PUCCH resource according to an embodiment of this application, where the PUCCH resource configured for a terminal device by using higher-layer signaling falls outside a subslot.
Figure 2B:
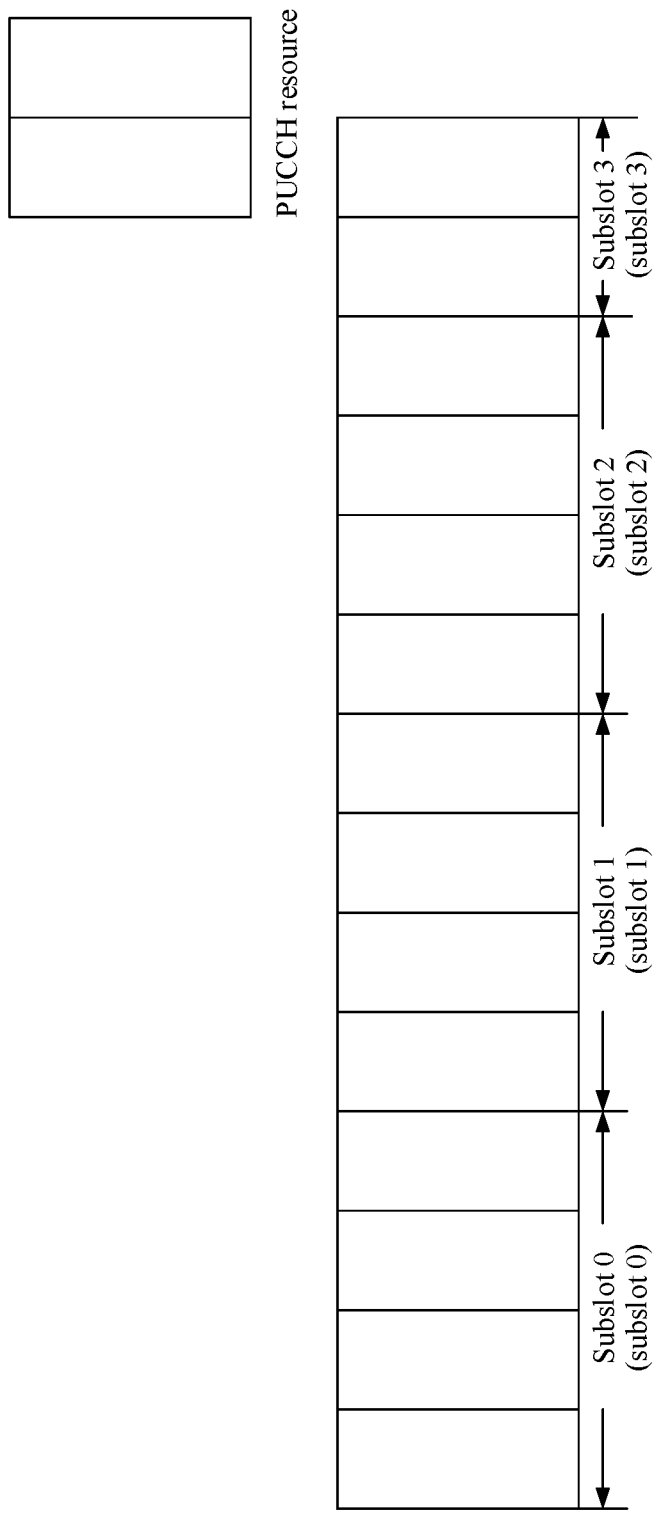

Based on the idea of the foregoing conventional technology, an NR system is used as an example. To enable the terminal device to feed back a HARQ-ACK message in a subslot, the network device configures a subslot-level PUCCH resource set for the terminal device by using higher-layer signaling. However, when a same group of PUCCH resource sets is configured in subslots having different quantities of symbols, a PUCCH resource in the PUCCH resource set may fall outside a subslot or cross a slot boundary. It is assumed that one slot is divided into four subslots: Three subslots each include four time domain symbols and one subslot includes two time domain symbols. A same group of PUCCH resource sets is configured in the subslots having different quantities of symbols. In this case, a PUCCH resource may fall completely outside a subslot, and a PUCCH resource may cross a slot boundary. In FIG. 2 (*a*), a parameter of a PUCCH resource configured by the network device for the terminal device includes: a starting symbol, being 2, of the PUCCH resource in a subslot, and a quantity of symbols of the PUCCH resource being 2. In a subslot 0, a subslot 1, and a subslot 3, the PUCCH resource may fall inside the subslots of the subslot 0, the subslot 1, and the subslot 3. However, in a subslot 2, the PUCCH resource falls completely outside the subslot 2. In FIG. 2 (b), a parameter of a PUCCH resource configured by the network device for the terminal device includes a starting symbol, being 1, of the PUCCH resource in a subslot, and a quantity of symbols of the PUCCH resource being 2. In this case, in a subslot 3, an end symbol of the PUCCH resource is not in a slot, that is, the PUCCH resource crosses a slot boundary. Therefore, to avoid the foregoing cases, a plurality of complex scenarios need to be considered when the network device configures the subslot-level PUCCH resource for the terminal device by using the higher-layer signaling. This results in high configuration complexity.

Figure 3:
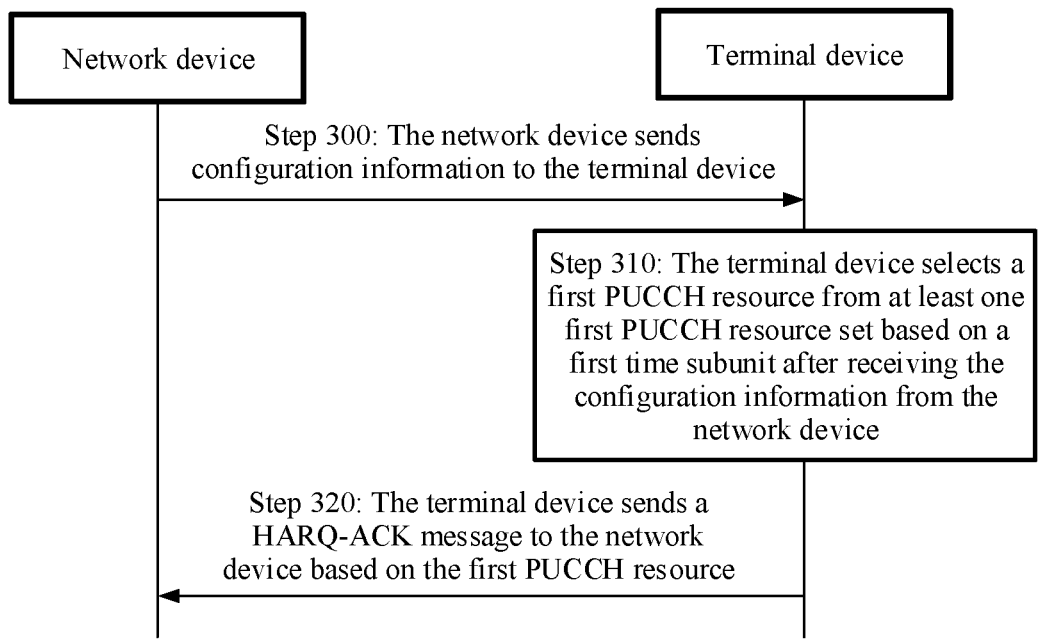
FIG. 3 is an overview flowchart of sending and receiving a HARQ-ACK message according to an embodiment of this application.

In view of this, an embodiment of this application provides a method for sending and receiving a HARQ-ACK message, to resolve high complexity in configuring a subslot-level PUCCH resource by a network device for a terminal device by using higher-layer signaling. As shown in FIG. 3, the method includes the following steps.

Step 300: A network device sends configuration information to a terminal device, where the configuration information indicates at least one first PUCCH resource set, and the at least one first PUCCH resource set is configured by the network device for the terminal device based on a time unit.

It should be understood that the at least one first PUCCH resource set is configured by the network device for the terminal device based on the time unit. In other words, each first PUCCH resource set in the at least one first PUCCH resource set is a time unit-level PUCCH resource set.

For example, the network device configures the at least one first PUCCH resource set for the terminal device by using higher-layer signaling. Each first PUCCH resource set includes several PUCCH resources. The higher-layer signaling herein is radio resource control (RRC) signaling. An NR system is used as an example. There are five different formats of the PUCCH resources according to different parameters of the PUCCH resources. A parameter of a PUCCH resource includes an index of a starting time domain symbol of the PUCCH resource in the time unit (for example, in the NR system, one slot includes 14 symbols, and corresponding indexes of the symbols are 0 to 13), a quantity of symbols of the PUCCH resource, a frequency domain position, and the like. The parameter of a PUCCH resource whose PUCCH format is a PUCCH format 2, a PUCCH format 3, and a PUCCH format 4 further includes a maximum code rate. It should be understood that, in this embodiment of this application, the maximum code rate of the PUCCH resource is a maximum code rate of the PUCCH resource whose PUCCH format is the PUCCH format 2, the PUCCH format 3, and the PUCCH format 4. In addition, a quantity of symbols of a PUCCH resource whose PUCCH format is a PUCCH format 0 and a PUCCH format 2 is 1 or 2. A quantity of symbols of a PUCCH resource whose PUCCH format is a PUCCH format 1, the PUCCH format 3, and the PUCCH format 4 is any value from 4 to 14.

In an embodiment, the network device may further configure at least one first PUCCH resource set for the terminal device based on the time unit and a priority of a service. For example, the network device configures a group of first PUCCH resource sets for each of different priorities of services based on the time unit. In this case, each group of first PUCCH resource sets includes the at least one first PUCCH resource set, and each group of first PUCCH resource sets corresponds to one service priority. Each first PUCCH resource set in each group of first PUCCH resource sets is a time unit-level PUCCH resource set. For example, it is assumed that HARQ-ACK messages need to be fed back for services of K priorities in one slot. Then, the network device may configure K groups of first PUCCH resource sets for the services of K priorities. The K groups of first PUCCH resource sets correspond respectively to the K priorities. Each group of first PUCCH resource sets includes at least one first PUCCH resource set, and each first PUCCH resource set is a time unit-level PUCCH resource set.

Further, to satisfy different priorities of services, each group of first PUCCH resource sets may further include the following characteristics:

First, a quantity of first PUCCH resource sets included in each group of first PUCCH resource sets is less than or equal to 4.

Secondly, a quantity of symbols of a PUCCH resource included in each first PUCCH resource set may be less than, or less than or equal to a maximum quantity of symbols of a PUCCH resource specified in a protocol or configured by the network device. For example, when a subcarrier spacing is given, the quantity of symbols of the PUCCH resource needs to meet a requirement of the services on latency. For example, for a service that has a high requirement on latency, a quantity of symbols of a PUCCH resource included in a first PUCCH resource set is 1 or 2, and a corresponding PUCCH format of the PUCCH resource is a PUCCH format 0 and/or a PUCCH format 2.

Thirdly, a maximum code rate of a PUCCH resource included in each first PUCCH resource set in each group of first PUCCH resource sets may be less than, or less than or equal to a maximum code rate of a PUCCH resource specified in a protocol or configured by the network device. It should be understood that a higher reliability requirement of a service, that is, a lower bit error rate requirement of the service indicates a lower maximum code rate.

Step 310: The terminal device selects a first PUCCH resource from the at least one first PUCCH resource set based on a first time subunit after receiving the configuration information from the network device, the first time subunit is a time subunit in which the HARQ-ACK message is located, and the first PUCCH resource is a PUCCH resource in the first time subunit.

In an embodiment, the terminal device receives downlink control information from the network device. The downlink control information includes time subunit quantity indication information K1 of an interval between a time subunit in which a PDSCH is located and the first time subunit, and a PRI. K1 is used to determine the first time subunit. The PRI is used to determine the first PUCCH resource.

When the terminal device selects the first PUCCH resource from the at least one first PUCCH resource set based on the first time subunit, the terminal device needs first to determine, based on K1 in the downlink control information, the first time subunit.

Figure 4:
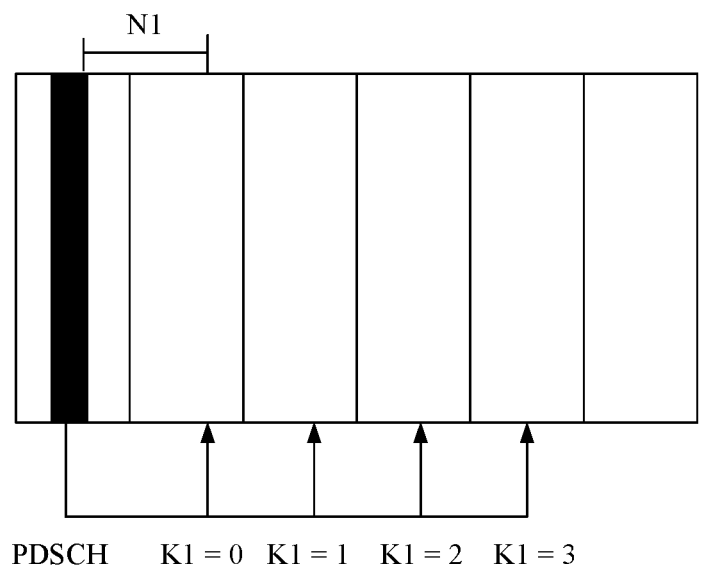
FIG. 4 is a first schematic diagram of using K1 to determine a first time unit according to an embodiment of this application.

The HARQ-ACK message usually cannot be fed back in a time subunit in which an end symbol of the PDSCH is located, because the terminal device needs time to receive and process the PDSCH before the terminal device feeds back the HARQ-ACK message. A length of the time is specifically related to a capability of the terminal device. In this way, if K1=0, and the first time subunit is the time subunit in which the end symbol of the PDSCH is located, K1 indication is wasted. If a time subunit that is far from the time subunit in which the PDSCH is located needs to be determined based on K1, K1 needs to occupy a larger quantity of bits. Therefore, this embodiment of this application provides an embodiment. If K1=0, the first time subunit is a time subunit in which a symbol is located, and the symbol corresponds to a symbol sequence number obtained by adding a symbol sequence number of the end symbol of the PDSCH to a quantity of symbols corresponding to PDSCH processing time. This may increase an indication range of K1 without increasing overheads of K1. As shown in FIG. 4, if K1=0, the first time subunit is a subslot in which the symbol is located, and the symbol corresponds to the symbol sequence number obtained by adding the sequence number of the end symbol of the PDSCH to the quantity NI of symbols corresponding to PDSCH processing time.

Figure 5:
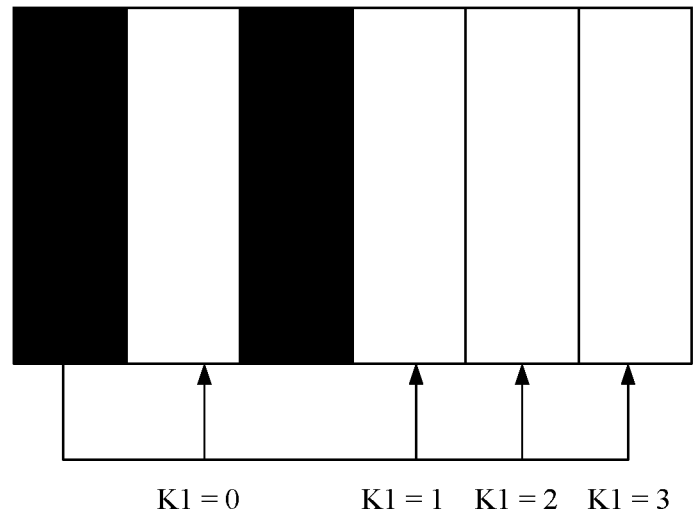
FIG. 5 is a second schematic diagram of using K1 to determine a first time unit according to an embodiment of this application.

In addition, in a scenario of time division duplexing (TDD), there is a time subunit that has no available PUCCH resource or a time subunit that includes no uplink symbol. The available PUCCH resource herein refers to a PUCCH resource belonging to a second PUCCH resource set. If K1 skips these time subunits during counting, the indication range of K1 may be increased, and the overheads of K1 may not be increased. In an embodiment, if K1=x, the first time subunit is an $(x+1)^{th}$ time subunit that has a PUCCH resource belonging to the second PUCCH resource set after the time subunit in which the PDSCH is located: or the first time subunit is an $(x+1)^{th}$ time subunit that includes at least one uplink symbol after the time subunit in which the PDSCH is located. In FIG. 5, a third subslot is a downlink subslot. To be specific, the subslot has no available PUCCH resource, and includes no uplink symbol. In this way, a subslot corresponding to K1=1 refers to a fourth subslot in FIG. 5.

After the terminal device determines the first time subunit based on K1, if the network device configures only one group of first PUCCH resource sets, and the group of PUCCH resource sets includes at least one first PUCCH resource set, the terminal device selects a first PUCCH resource from the group of first PUCCH resource sets based on the first time subunit. Alternatively, if the network device configures a group of first PUCCH resource sets for each of different priorities of services based on the time unit, the terminal device needs to first determine, based on a priority of a service corresponding to the HARQ-ACK message that needs to be fed back, a group of first PUCCH resource sets with the same priority, and then selects a first PUCCH resource from the group of PUCCH resource sets.

Specifically, when the terminal device selects the first PUCCH resource from the at least one first PUCCH resource set based on the first time subunit, the terminal device needs to determine the second PUCCH resource set to which the first PUCCH resource belongs. In other words, a time subunit-level PUCCH resource set is determined from PUCCH resources included in a time unit-level PUCCH resource set. The first PUCCH resource is one PUCCH resource in the second PUCCH resource set.

In an embodiment, the second PUCCH resource set is an overlapping part between a set of PUCCH resources whose starting symbols are located in the first time subunit in the at least one first PUCCH resource set and one PUCCH resource set determined from the at least one first PUCCH resource set based on a quantity of bits of the HARQ-ACK message.

For example, the terminal device may determine the second PUCCH resource set in the following manners (but the present application is not limited to the following manners):

Manner 1: The terminal device determines one PUCCH resource set as a third PUCCH resource set from the at least one first PUCCH resource set based on the quantity of bits of the HARQ-ACK message. The terminal device further selects, from the third PUCCH resource set, PUCCH resources whose starting symbols are located in the first time subunit, to obtain the second PUCCH resource set.

Manner 2: The terminal device selects PUCCH resources whose starting symbols are located in the first time subunit from each first PUCCH resource set in the at least one first PUCCH resource set, to obtain at least one fourth PUCCH resource set. For example, a quantity of first PUCCH resource sets is four. It is assumed that three of the four first PUCCH resource sets include the PUCCH resources whose starting symbols are located in the first time subunit. In this case, the terminal device selects the PUCCH resources whose starting symbols are located in the first time subunit from each first PUCCH resource set, to obtain three fourth PUCCH resource sets. Further, the terminal device determines one PUCCH resource set as the second PUCCH resource set from the at least one fourth PUCCH resource set based on the quantity of bits of the HARQ-ACK message.

Optionally, the terminal device may further select, from the second PUCCH resource set, a PUCCH resource whose maximum code rate is less than, or less than or equal to a maximum code rate of a PUCCH resource specified in a protocol or configured by the network device, and/or a PUCCH resource of which a quantity of symbols is less than, or less than or equal to a maximum quantity of symbols of the PUCCH resource specified in a protocol or configured by the network device, to obtain a finally determined second PUCCH resource set.

Further, after the terminal device determines the second PUCCH resource set, the terminal device further needs to select the first PUCCH resource from the second PUCCH resource set based on the PRI in the downlink control information. This specifically includes the following scenarios:

Scenario 1: If a quantity M of PUCCH resources included in the second PUCCH resource set is less than or equal to $2^k$, and k is a quantity of bits occupied by the PRI, each PUCCH resource in the second PUCCH resource set can be indicated by the PRI. k is a positive integer greater than or equal to 1.

Figure 6:
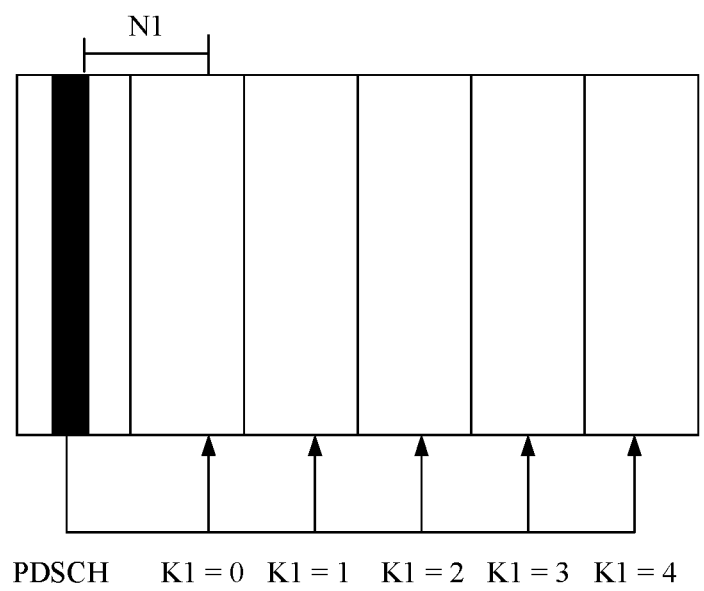
FIG. 6 is a schematic diagram of using a PRI to determine a first time unit and a first PUCCH resource according to an embodiment of this application.

In addition, if M is less than $2^k$, a portion of $\Delta_{PRI}$ is not used. $\Delta_{PRI}$ represents a field of the PRI. As shown in FIG. 6, when M=2 and k=2, K1 occupies 2 bits, and the PRI occupies 2 bits. Two indicators $\Delta_{PRI}$=10.11 may not be used. In this case, $\Delta_{PRI}$=10.11 may be used to indicate a subslot corresponding to K1=N+1 and a PUCCH resource in the subslot corresponding to K1=N+1. N represents an original maximum indication range of K1. Originally, the HARQ-ACK message can be fed back only in one of four subslots respectively corresponding to K1=0 to K1=3. However, in this case, $\Delta_{PRI}$=10 may indicate a subslot corresponding to K1=4, and a PUCCH resource in the subslot corresponding to K1=4 that is determined based on the subslot corresponding to K1=4 from the at least one first PUCCH resource set. $\Delta_{PRI}$=11 may indicate the subslot corresponding to K1=4 and another PUCCH resource in the subslot corresponding to K1=4 that is determined based on the subslot corresponding to K1=4 from the at least one first PUCCH resource set. $\Delta_{PRI}$=10 and $\Delta_{PRI}$=11 indicate the same subslot, but different PUCCH resources.

Scenario 2: If a quantity M of PUCCH resources included in the second PUCCH resource set is greater than $2^k$, and k is a quantity of bits occupied by the PRI, only $2^k$ PUCCH resources in second PUCCH resource set can be indicated by the PRI. k is a positive integer greater than or equal to 1. An end symbol of any one of the $2^k$ PUCCH resources is less than an end symbol of any one of remaining M–$2^k$ PUCCH resources in the second PUCCH resource set. In other words, the PUCCH resources are arranged in ascending order of end symbols (where the end symbols may be calculated based on starting symbols and quantities of symbols) of the PUCCH resources, and the first $2^k$ PUCCH resources are selected.

Alternatively, if the quantity M of PUCCH resources included in the first PUCCH resource set is greater than $2^k$, the first PUCCH resource indicated by the PRI is a PUCCH resource whose sequence number is $r_{PUCCH}$.

$$r_{PUCCH} = \begin{cases} \left\lfloor \frac{n_{CCE,p} \cdot \lfloor M/2^k \rfloor}{N_{CCE,p}} \right\rfloor + \Delta_{PRI} \cdot \left\lfloor \frac{M}{2^k} \right\rfloor & \text{if } \Delta_{PRI} < M\mathrm{mod}2^k \\ \left\lfloor \frac{n_{CCE,p} \cdot \lfloor M/2^k \rfloor}{N_{CCE,p}} \right\rfloor + \Delta_{PRI} \cdot \left\lfloor \frac{M}{2^k} \right\rfloor + M\mathrm{mod}2^k & \text{if } \Delta_{PRI} \geq M\mathrm{mod}2^k \end{cases}$$

$r_{PUCCH}$ represents a sequence number of the PUCCH resource, and $0 \leq r_{PUCCH} \leq M-1$; $\Delta_{PRI}$ represents a field of the PRI, and $0 \leq \Delta_{PRI} \leq 2^k-1$; $N_{CCE,p}$ is a quantity of control channel elements (CCEs) in a control resource set in which a physical downlink control channel (PDCCH) is located; and $n_{CCE,p}$ is an initial CCE sequence number of the PDCCH.

Step 320: The terminal device sends the HARQ-ACK message to the network device based on the first PUCCH resource.

The network device knows the first time subunit and the first PUCCH resource, and may receive the HARQ-ACK message from the terminal device based on the first PUCCH resource.

Compared with the conventional technology, in this embodiment of this application, the network device configures the time unit-level PUCCH resource set by using higher-layer signaling, and the terminal device determines the time subunit-level PUCCH resource set from the time unit-level PUCCH resource set, and determines one PUCCH resource from the time subunit-level PUCCH resource set based on the PRI. This can avoid exceptions, for example, a large amount of higher-layer signaling needs to be reconfigured, a PUCCH resource falls outside a time subunit, or a PUCCH resource crosses a time unit boundary.

In the foregoing embodiments provided in this application, the solutions of the communications method provided in the embodiments of this application are described from a perspective of the network elements and from a perspective of interaction between the network elements. It may be understood that, to implement the foregoing functions, the network elements such as the network device and the terminal device include a corresponding hardware structure and/or software module that is used to perform the functions. A person skilled in the art should easily be aware that, in combination with units and algorithm steps of the examples described in the embodiments disclosed in this specification, this application may be implemented by hardware or a combination of hardware and computer software. Whether a specific function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 7:
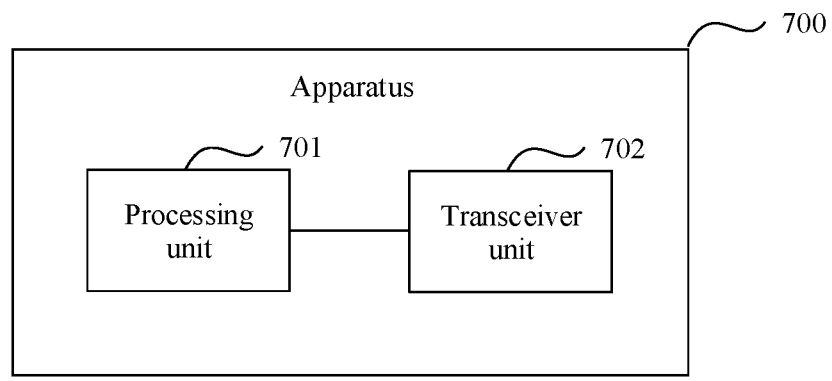
FIG. 7 is a first schematic diagram of a structure of an apparatus according to this application.

Same as the foregoing idea, as shown in FIG. 7, an embodiment of this application further provides an apparatus 700. The apparatus 700 includes a transceiver unit 702 and a processing unit 701.

In an example, the apparatus 700 is configured to implement functions of the network device in the foregoing method. The apparatus may be a network device, or may be an apparatus in the network device.

The processing unit 701 is configured to invoke the transceiver unit 702 to send configuration information to a terminal device. The configuration information indicates at least one first PUCCH resource set. The at least one first PUCCH resource set is configured by the network device for the terminal device based on a time unit.

The processing unit 701 is further configured to invoke the transceiver unit 702 to receive a HARQ-ACK message from the terminal device based on a first PUCCH resource. A first time subunit is a time subunit in which the HARQ-ACK message is located. The first PUCCH resource is a PUCCH resource in the first time subunit. The first PUCCH resource is one PUCCH resource in the at least one first PUCCH resource set.

In an example, the apparatus 700 is configured to implement functions of the terminal device in the foregoing method. The apparatus may be a terminal device, or may be an apparatus in the terminal device.

The processing unit 701 selects a first physical uplink control channel (PUCCH) resource from at least one first PUCCH resource set based on a first time subunit. The first time subunit is a time subunit in which a hybrid automatic repeat request acknowledgement (HARQ-ACK) message is located. The first PUCCH resource is a PUCCH resource in the first time subunit. The at least one first PUCCH resource set is configured by a network device for the terminal device based on a time unit. The transceiver unit 702 sends the HARQ-ACK message to the network device based on the first PUCCH resource.

For specific execution processes of the processing unit 701 and the transceiver unit 702, refer to the descriptions in the foregoing method embodiments. Division into the modules in the embodiments of this application is an example, is merely division into logical functions, and may be other division during actual implementation. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

As another optional variation, the apparatus may be a chip system. In this embodiment of this application, the chip system may include a chip, or may include a chip and another discrete component. For example, the apparatus includes a processor and an interface, and the interface may be an input/output interface. The processor implements functions of the processing unit 701, and the interface implements functions of the transceiver unit 702. The apparatus may further include a memory. The memory is configured to store a program that can run on the processor. When the processor executes the program, the method of the embodiment shown in FIG. 3 is performed.

Figure 8:
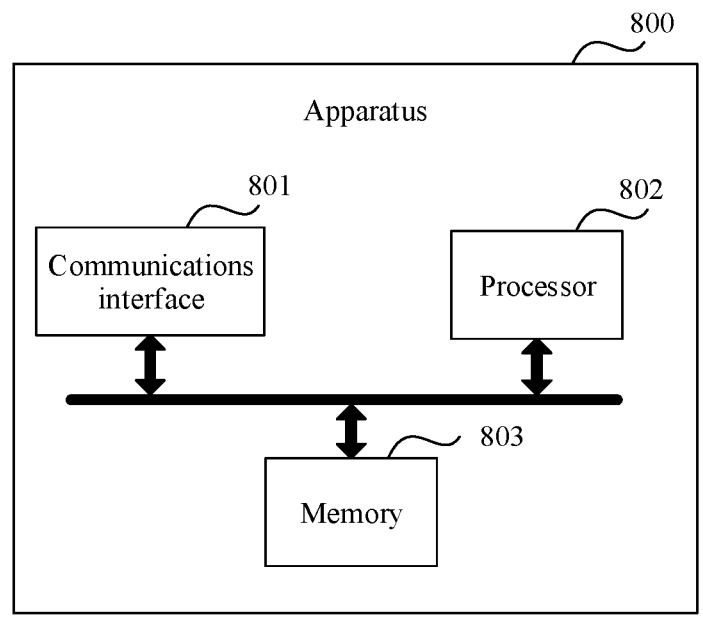
FIG. 8 is a second schematic diagram of a structure of an apparatus according to this application.

Same as the foregoing idea, as shown in FIG. 8, an embodiment of this application further provides an apparatus 800. The apparatus 800 includes a communications interface 801, at least one processor 802, and at least one memory 803. The communications interface 801 is configured to communicate with another device by using a transmission medium, so that an apparatus in the apparatus 800 can communicate with the another device. The memory 803 is configured to store a computer program. The processor 802 invokes a computer program stored in the memory 803, to send and receive data through the communications interface 801, and implement the method in the foregoing embodiments.

For example, when the apparatus is a network device, the memory 803 is configured to store the computer program. The processor 802 invokes the computer program stored in the memory 803, to perform, through the communications interface 801, the method performed by the network device in the foregoing embodiments. When the apparatus is a terminal device, the memory 803 is configured to store the computer program. The processor 802 invokes the computer program stored in the memory 803, to perform, through the communications interface 801, the method performed by the terminal device in the foregoing embodiments.

In this embodiment of this application, the communications interface 801 may be a transceiver, a circuit, a bus, a module, or a communications interface of another type. The processor 802 may be a general-purpose processor, a digital signal processor, an application-specific integrated circuit, a field programmable gate array or another programmable logic device, a discrete gate or transistor logic device, or a discrete hardware component. The processor 802 may implement or execute the methods, steps, and logical block diagrams disclosed in the embodiments of this application. The general-purpose processor may be a microprocessor, any conventional processor, or the like. The steps of the method disclosed with reference to the embodiments of this application may be directly presented as being performed and completed by a hardware processor, or performed and completed by a combination of hardware and a software module in the processor. The memory 803 may be a nonvolatile memory, for example, a hard disk drive (HDD) or a solid-state drive (SSD), or may be a volatile memory, for example, a random access memory (RAM). The memory is any other medium that can be configured to carry or store expected program code in a form of an instruction or a data structure and that can be accessed by a computer, but is not limited thereto. The memory in this embodiment of this application may alternatively be a circuit or any other apparatus that can implement a storage function. The memory 803 is coupled to the processor 802. Coupling in the embodiments of this application may be indirect coupling or a communications connection between apparatuses, units, or modules in an electrical form, a mechanical form, or another form, and is used for information exchange between the apparatuses, the units, or the modules. In another implementation, the memory 803 may alternatively be located outside the apparatus 800. The processor 802 may operate in collaboration with the memory 803. The processor 802 may execute instructions of the program stored in the memory 803. At least one of the at least one memory 803 may alternatively be included in the processor 802. A connection medium between the communications interface 801, the processor 802, and the memory 803 is not limited in this embodiment of this application. For example, in this embodiment of this application, the memory 803, the processor 802, and the communications interface 801 may be connected through a bus in FIG. 8. The bus may be classified into an address bus, a data bus, a control bus, or the like.

It may be understood that the apparatus in the embodiment shown in FIG. 7 may be implemented by using the apparatus 800 shown in FIG. 8. Specifically, the processing unit 701 may be implemented by the processor 802, and the transceiver unit 702 may be implemented by the communications interface 801.

This embodiment of this application further provides a non-transitory computer-readable storage medium, and the computer-readable storage medium stores a computer program. When the computer program runs on a computer, the computer is enabled to perform the method according to the foregoing embodiments.

All or a part of the methods in the embodiments of this application may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, all or a part of the procedures or the functions according to the embodiments of the present invention are generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example a server or a data center, integrating one or more usable media. The usable medium may be a magnetic medium (for example, a floppy disk, a hard disk, or a magnetic tape), or an optical medium (for example, a digital video disc (DVD)), or a semiconductor medium (for example, a solid-state disk (SSD)), or the like.

The foregoing embodiments are merely used to describe exemplary technical solutions of this application. The descriptions of the foregoing embodiments are merely intended to help understand embodiments of the present invention. and shall not be construed as a limitation on embodiments of the present invention. Variations or replacements readily figured out by a person skilled in the art may fall within the protection scope of the present application.

What is claimed is:

1. A method for sending hybrid automatic repeat request acknowledgement (HARQ-ACK) information, comprising:
    selecting, by a terminal device or a chip, a first physical uplink control channel (PUCCH) resource from at least one first PUCCH resource set based on a first time subunit, wherein the first time subunit is a time subunit in which HARQ-ACK information is located, and wherein the first PUCCH resource is a PUCCH resource in the first time subunit; and
    sending, by the terminal device or the chip, the HARQ-ACK information to a network device based on the first PUCCH resource;
    wherein the first PUCCH resource is a PUCCH resource of a second PUCCH resource set;
    wherein a starting symbol of the first PUCCH resource is determined based on the first time subunit, and the second PUCCH resource set is determined from the at least one first PUCCH resource set based on a quantity of bits of the HARQ-ACK information; and wherein a quantity of symbols of the first PUCCH resource comprised in the second PUCCH resource set is less than or equal to a maximum quantity of symbols of a PUCCH resource specified in a protocol or configured by the network device.

2. The method according to claim 1, wherein the at least one first PUCCH resource set corresponds to a priority of a service corresponding to the HARQ-ACK information.

3. The method according to claim 1, further comprising:
receiving, by the terminal device, downlink control information from the network device, wherein the downlink control information comprises:
time subunit quantity indication information K1 of an interval between a time subunit in which a physical downlink shared channel (PDSCH) is located and the first time subunit, wherein K1 is usable to determine the first time subunit; and
a physical uplink control channel resource indicator (PRI), wherein the PRI is used to determine the first PUCCH resource.

4. The method according to claim 3, wherein K1=0, wherein the first time subunit is a time subunit in which a symbol is located, and wherein the symbol corresponds to a symbol sequence number obtained by adding a symbol sequence number of an end symbol of the PDSCH to a quantity of symbols corresponding to a PDSCH processing time.

5. An apparatus, comprising at least one processor and at least one memory storing instructions, wherein the at least one processor is configured to execute the instructions to cause the following to be performed:
selecting a first physical uplink control channel (PUCCH) resource from at least one first PUCCH resource set based on a first time subunit, wherein the first time subunit is a time subunit in which hybrid automatic repeat request acknowledgement (HARQ-ACK) information is located, and wherein the first PUCCH resource is a PUCCH resource in the first time subunit; and
sending the HARQ-ACK information to a network device based on the first PUCCH resource;
wherein the first PUCCH resource is a PUCCH resource of a second PUCCH resource set;
wherein a starting symbol of the first PUCCH resource is determined based on the first time subunit, and the second PUCCH resource set is determined from the at least one first PUCCH resource set based on a quantity of bits of the HARQ-ACK information; and
wherein a quantity of symbols of the first PUCCH resource comprised in the second PUCCH resource set is less than or equal to a maximum quantity of symbols of a PUCCH resource specified in a protocol or configured by the network device.

6. The apparatus according to claim 5, wherein the at least one first PUCCH resource set corresponds to a priority of a service corresponding to the HARQ-ACK information.

7. The apparatus according to claim 5, wherein the at least one processor is further configured to execute the instructions to cause the following to be performed:
receiving downlink control information from the network device, wherein the downlink control information comprises:
time subunit quantity indication information K1 of an interval between a time subunit in which a physical downlink shared channel (PDSCH) is located and the first time subunit, wherein K1 is used to determine the first time subunit; and
a physical uplink control channel resource indicator (PRI), wherein the PRI is used to determine the first PUCCH resource.

8. The apparatus according to claim 7, wherein K1=0, wherein the first time subunit is a time subunit in which a symbol is located, and wherein the symbol corresponds to a symbol sequence number obtained by adding a symbol sequence number of an end symbol of the PDSCH to a quantity of symbols corresponding to a PDSCH processing time.

9. The apparatus according to claim 5, wherein the apparatus is a terminal device or a chip.

10. An apparatus, comprising at least one processor and at least one memory storing instructions, wherein the at least one processor is configured to execute the instructions to cause the following to be performed:
sending configuration information to a terminal device, wherein the configuration information indicates at least one first physical uplink control channel (PUCCH) resource set; and
receiving hybrid automatic repeat request acknowledgement (HARQ-ACK) information from the terminal device based on a first PUCCH resource, wherein the first PUCCH resource is a PUCCH resource in a first time subunit, wherein the first time subunit is a time subunit in which the HARQ-ACK information is located, and wherein the first PUCCH resource is one PUCCH resource in the at least one first PUCCH resource set;
wherein the first PUCCH resource is a PUCCH resource of a second PUCCH resource set;
wherein a starting symbol of the first PUCCH resource is determined based on the first time subunit, and the second PUCCH resource set is determined from the at least one first PUCCH resource set based on a quantity of bits of the HARQ-ACK information; and
wherein a quantity of symbols of the first PUCCH resource comprised in the second PUCCH resource set is less than or equal to a maximum quantity of symbols of a PUCCH resource specified in a protocol or configured by the apparatus.

11. The apparatus according to claim 10, wherein the at least one first PUCCH resource set corresponds to a priority of a service corresponding to the HARQ-ACK information.

12. The apparatus according to claim 10, wherein the at least one processor is further configured to execute the instructions to cause the following to be performed:
sending downlink control information to the terminal device, wherein the downlink control information comprises:
time subunit quantity indication information K1 of an interval between a time subunit in which a physical downlink shared channel (PDSCH) is located and the first time subunit, wherein K1 is used to determine the first time subunit; and
a physical uplink control channel resource indicator (PRI), wherein the PRI is used to determine the first PUCCH resource.

13. The apparatus according to claim 12, wherein K1=0, wherein the first time subunit is a time subunit in which a symbol is located, and wherein the symbol corresponds to a symbol sequence number obtained by adding a symbol sequence number of an end symbol of the PDSCH to a quantity of symbols corresponding to a PDSCH processing time.

14. The apparatus according to claim 10, wherein the apparatus is a network device or a chip.

\* \* \* \* \*